June 25, 1963
I. J. WARDLE
3,094,794
SELF-LOADING CARRY-ALL VEHICLE
Filed Nov. 7, 1958
2 Sheets-Sheet 1
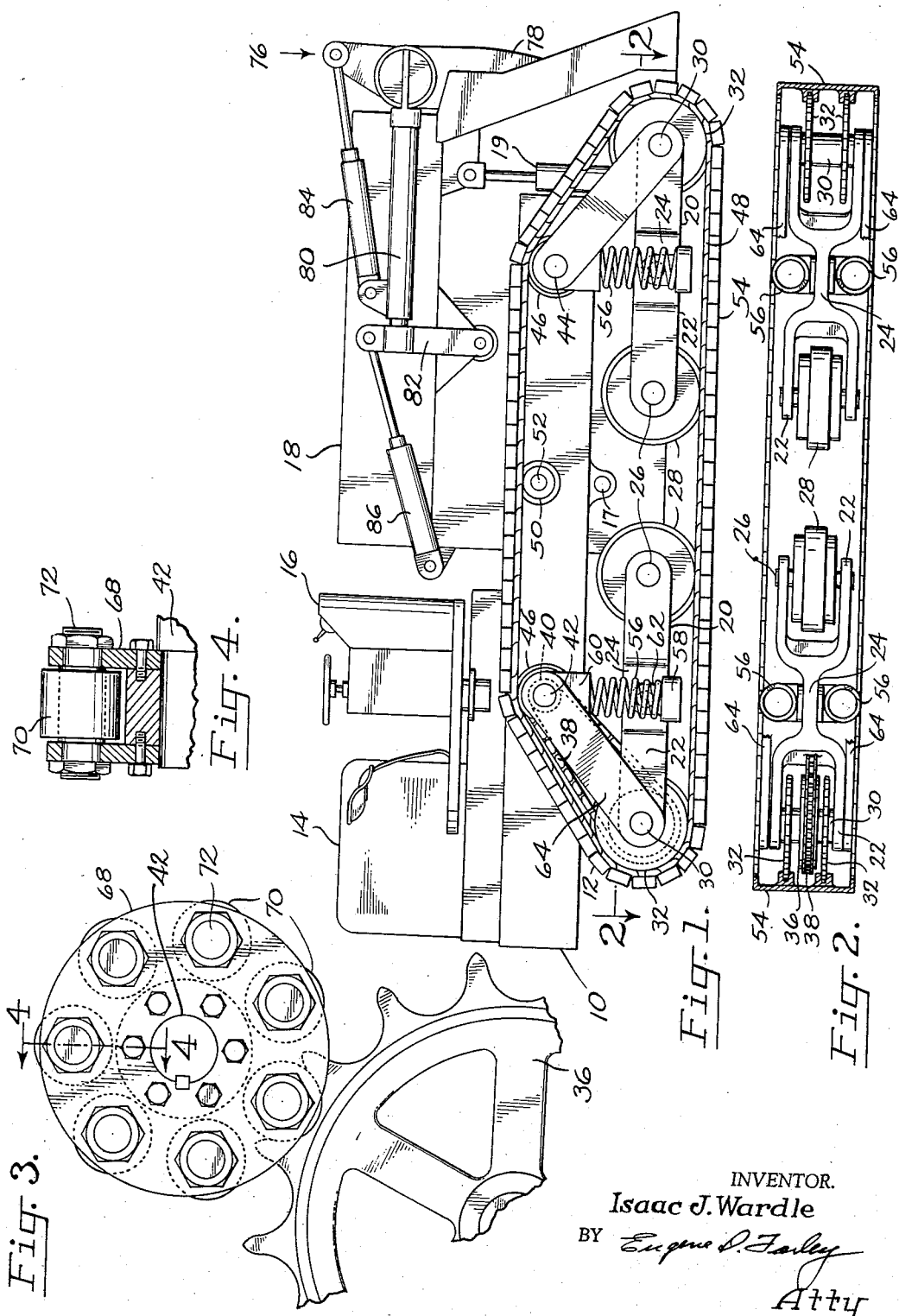
INVENTOR.
Isaac J. Wardle
BY Eugene D. Farley
Atty

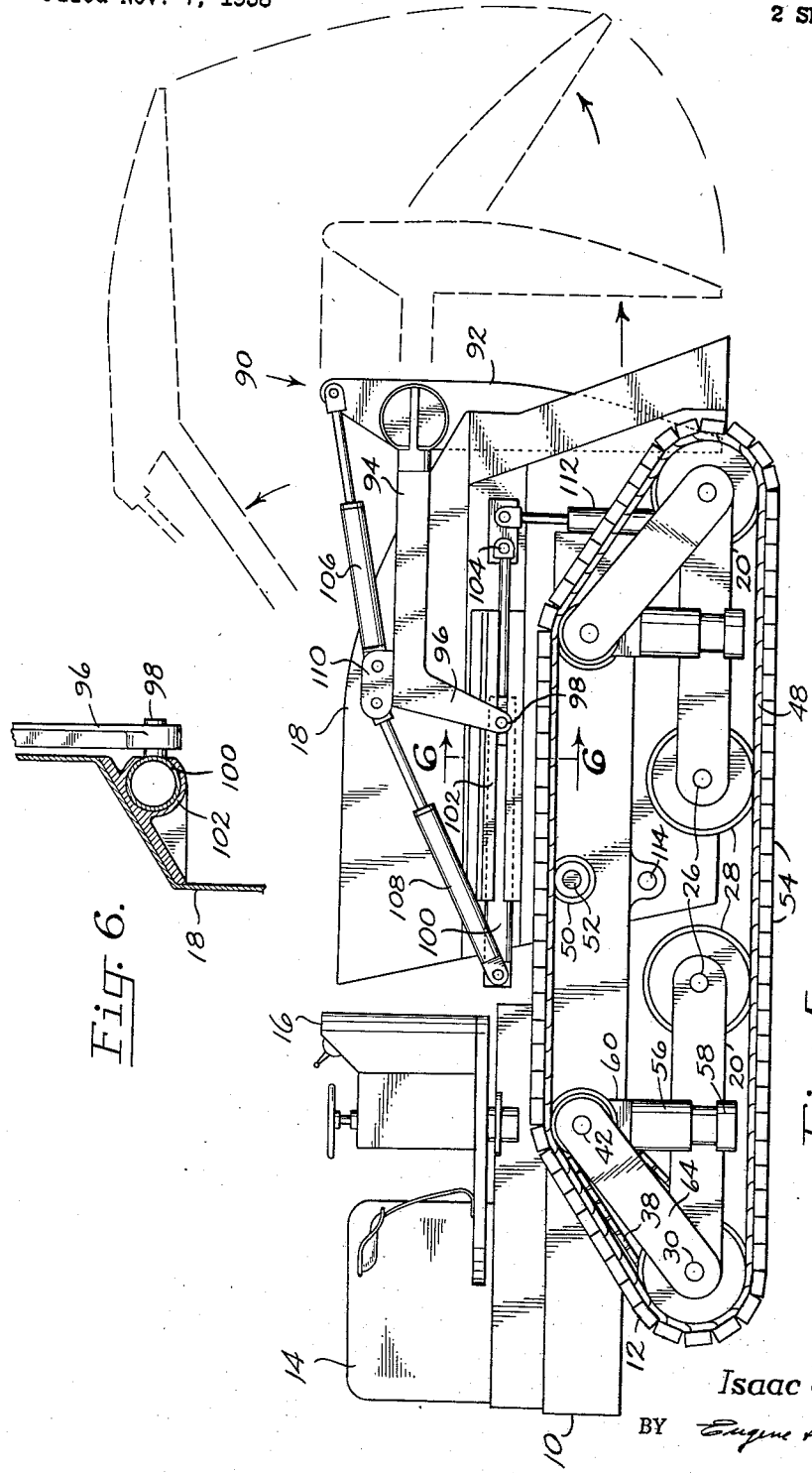

United States Patent Office 3,094,794
Patented June 25, 1963

3,094,794
SELF-LOADING CARRY-ALL VEHICLE
Isaac J. Wardle, Pierce Park Lane, Rte. 3, Boise, Idaho
Filed Nov. 7, 1958, Ser. No. 772,528
1 Claim. (Cl. 37—4)

This invention relates to a self-loading, carry-all vehicle which may be used for digging, scrapping, loading, hauling, dumping, and spreading operations such as in grading work or for handling bulk material such as sand, gravel, or agricultural products and like materials.

An object of the present invention is to provide a vehicle of the type described employing improved means for supporting and propelling the vehicle whereby the vehicle is capable of operating on rough terrain while maintaining maximum traction engagement with the terrain and maintaining its load handling box in a plane substantially parallel to the overall plane of the terrain.

Another object is to provide a carry-all vehicle employing propelling means capable of moving the vehicle at a relatively high rate of speed as compared with conventional vehicles of this type.

A further object is to provide a carry-all vehicle which employs resilient support means intermediate the chassis and track laying support and propelling means.

Another object is to provide improved sprocket drive means for a track laying vehicle.

A further object is to provide a carry-all vehicle having improved self-loading means, and more particularly having longitudinally slidable or extendable means capable of pulling material into the receptacle or loading box and also capable of shifting the load to the rear end of the box to obtain maximum load handling.

The manner in which the foregoing and other objects of this invention are accomplished will be apparent from the accompanying specification and claim considered together with the drawings wherein like numerals of reference indicate like parts and wherein:

FIG. 1 is a side elevational view of a self-loading carry-all vehicle utilizing improved means for supporting and propelling the vehicle;

FIG. 2 is a longitudinal sectional view of the supporting and propelling means, taken on the line 2—2 of FIG. 1;

FIG. 3 is an alternative form of drive means for the supporting and propelling means;

FIG. 4 is a sectional view taken on the line 4—4 of FIG. 3;

FIG. 5 is a side elevational view of a carry-all vehicle of the type described having improved means for loading material into the load handling box; and FIG. 6 is a sectional view taken on the line 6—6 of FIG. 5.

Referring first to FIGS. 1 and 2, a carry-all vehicle of the present invention comprises in general a chassis or frame 10 supported on a pair of side track assemblies 12. The chassis 10 supports a power unit 14, an operator's control panel 16, and a receptacle or loading box 18 open at the front and top.

Box 18 is pivotally mounted on the chassis adjacent the rear thereof by shaft 17 and the front end of the box is supported on piston rods of fluid cylinders 19 mounted on the chassis at opposite sides of the box. The front end of the loading box may thereby be lowered to ground level if desired for scraping operations or for picking up material. Box 18 has ejecting means, not shown, which may comprise ram means movable longitudinally within the box.

Each of the track assemblies 12 comprises a pair of truck members 20, and as best seen in FIG. 2 these truck members have oppositely extending fork portions 22 connected together by a body portion 24. Rotatably mounted on a shaft 26 supported between one of the forked portions of each truck member is a free running wheel 28, and disposed at the opposite end of each truck is a shaft 30. The shaft 30 of the truck adjacent the rear of the vehicle is a driven shaft while the shaft 30 of the truck at the front of the vehicle is not driven. Each of the shafts 30 carries a pair of sprockets 32, the sprockets 32 on the one shaft 30 being driven sprockets and the sprockets on the other shaft 30 being idler sprockets.

Keyed to the driven shaft 30 is a sprocket 36 which meshes with a drive chain 38 also disposed in meshing relation with a drive sprocket 40 keyed to drive shaft 42. Shaft 42 is operated in forward or reverse directions by the power unit 14, and while this shaft is designated herein as the sole driving means for a track assembly it is to be understood that a shaft 44 similarly positioned at the opposite end of the track assembly may also comprise a drive shaft. Pairs of idler sprockets 46 are mounted on the shafts 42 and 44 for meshing engagement with an endless chain 48 also meshing with an upper idler sprocket 50 rotatable on a shaft 52 and the end sprockets 32. Endless chains 48 are connected to and carry therewith an endless ground engaging track member 54.

The vehicle is resiliently supported on the track assemblies by pairs of heavy coil springs 56 supported on bases 58 mounted on the trucks 20. The upper ends of these springs engage block members 60 pivotally mounted on the shafts 42 and 44. Lower bases 58 are pivotally mounted on the body portion 24 of the trucks 20 by pins 62. It is to be understood of course that other suitable resilient support means may be used in lieu of the springs 56 such as inflatable cushion means.

Shafts 42 and 44 are connected to their respective lower shafts 30 by pairs of radius arms or end links 64. Arms 64 are inclined upwardly in convergent relation. By such mounting arrangement it will be seen that the chassis is resiliently supported on the track assemblies and the linkage used therewith permits maximum traction in that if the vehicle is negotiating rough terrain the tracks are capable of contouring themselves to the terrain. For example, if the front portion of one of the track assemblies encounters a depression, the radius arms 64 associated with the truck at this end swing down to permit the front end of such truck to fall and follow the contour of the terrain. If encountering an obstacle the front end of the truck will rise. As the radius arms maintain the same distance between the shafts 42, 44 and their respective shafts 30, there will be a constant tension maintained on the track 54 at all times. This structure provides maximum traction for the tracks and also it will be apparent that the vehicle chassis will be maintained substantially parallel with the general or overall grade. The chain drive also provides a suitable predetermined drive ration which permits operation of the vehicle at high rates of speeds as far as this type of vehicle is concerned.

Referring to FIGS. 3 and 4 there is shown an alternative form of drive means for the track assemblies 12. In this arrangement a pinion wheel 68 is keyed to the drive shaft 42 and is disposed in meshing relationship with the lower sprocket 36 for operating shaft 30. Wheel 68 carries a plurality of steel sleeves 70 rotatably mounted on shafts 72 and engageable with teeth of sprocket 36.

Associated with the loading box 18 is a power operated apron assembly 76 employing power means and lever means duplicated on both sides of the box. This assembly includes an apron 78 pivotally mounted at its sides and intermediate its upper and lower ends to a pair of cylinder arms 80 the inner ends of which are rigidly attached to lever arms 82 pivotally mounted on the side walls of the loading box 18.

Angular movement of apron 78 around its point of attachment to cylinder arms 80 is accomplished by means of cylinders 84. One end of cylinders 84 is pivotally connected to the arms 80 and the piston rods of cylinders 84 are pivotally connected to the upper end of the apron 78. Angular movement of the cylinder arms 80 is achieved by means of cylinders 86 pivotally connected to the rear end of the box. The piston rods of cylinders 86 are pivotally connected to the upper end of lever arms 82. Extension of cylinder arms 80 may be obtained by actuating the cylinder of which it is comprised.

Thus, a variety of elevating, sweeping and lowering movements may be imparted to the apron which thereby acts to engage material whether it be at high or low elevation to move it in the direction of the box and to sweep it up over any accumulation of material within the box into the rearward portion thereof, thus filling the box rapidly, efficiently, and with a minimum of power expenditure.

Referring now to FIGS. 5 and 6 there is illustrated in association with the chassis and track assembly structures heretofore described an apron assembly 90 which, importantly, is adjustable in a longitudinal direction relative to the loading box 18. This assembly includes an apron 92 pivotally mounted between the ends of a pair of lever arms 94 having an angular end portion 96 pivotally mounted on pins 98 projecting radially from the wall of a fluid cylinder 100.

Each of cylinders 100 is slidable longitudinally in arcuate guideways 102 integrally attached to the loading box 18. The piston rods of cylinders 100 are pivotally attached to the loading box at a forward point by means of pins 104.

Angular movement of apron 92 about its point of attachment with lever arms 94 is accomplished by a cylinder 106. The rear end of cylinder 106 is pivotally attached to the rear end of arm 94 and the piston rod thereof is pivotally attached to the upper end of the apron 92. Pivotal movement of the arms 94 is accomplished by means of cylinders 108 pivotally connected to the rear portion of the cylinder 100 and also pivotally connected by means of its piston rod to the rear end of arm 94, the arm 94 having a bracket 110 for connection to the piston rod of cylinder 108 and the cylinder 106.

It will thereby be seen that the cylinders 106 are adapted to pivot the apron 92 around its supporting pivot, the cylinders 108 are adapted to rotate the arms 94, and the cylinders 100 are capable of sliding the entire apron assembly to selected longitudinal positions. Thus, a variety of elevating, sweeping and lowering movements may be imparted to the apron as indicated by the arrows in FIG. 5.

More specifically, it will be seen that the apron 92 can be moved forwardly of the loading box 18, as shown in dotted lines in FIG. 5. By a series of pivoting movements with arms 94 and longitudinal reciprocal movement by means of cylinders 100, material can be pulled into the box 18. Also, by retracting the apron assembly with cylinders 100, the arcuate movement of the apron 92, by means of arms 94 and the pivotal movement of the apron by means of cylinders 106, can be controlled to move accumulated material at the upper portion of the box to the rear of the box.

Therefore, by retracting the apron assembly by means of the cylinder 100 the apron 92 can be used to completely fill the box including the void which ordinarily exists at the upper rearward portion of the box.

The front end of box 18 is pivotally supported on piston rods of fluid cylinders 112 on opposite sides of the chassis and thereby the front end may be lowered to substantially ground level for scooping material. For this purpose the rear end of the box is pivotally supported on a shaft 114 carried by the chassis.

It is to be understood that the forms of my invention herein shown and described are to be taken as preferred examples of the same and that various changes in the shape, size and arrangement of parts may be resorted to without departing from the spirit of my invention or the scope of the subjoined claim.

Having thus described my invention, I claim:

A carry-all vehicle comprising a mobile frame; a receptacle supported on the frame for receiving material to be carried; an apron member; an apron support mounted on the receptacle; first pivot means attaching the apron to the forward end of the support; second pivot means supporting at least a forward portion of the support for rotation on a horizontal axis whereby the apron is movable with said forward portion of the support between upper and lower positions, the support including first drive means having a member movable longitudinally of the receptacle for moving the apron in such longitudinal direction; second drive means pivotally connected to the pivoted apron support for rotating the latter on its horizontal axis; and third drive means interconnecting the apron and pivoted support for pivoting the apron in its support.

References Cited in the file of this patent

UNITED STATES PATENTS

| | | |
|---|---|---|
| 1,427,188 | Boldt | Aug. 29, 1922 |
| 1,491,788 | Chance et al. | Apr. 29, 1924 |
| 1,903,675 | Hauge | Apr. 11, 1933 |
| 2,011,565 | Barnes | Aug. 20, 1935 |
| 2,019,482 | Barnes | Nov. 5, 1935 |
| 2,189,222 | Rapp | Feb. 6, 1940 |
| 2,396,287 | Robb | Mar. 12, 1946 |
| 2,961,106 | Davis | Nov. 22, 1960 |

FOREIGN PATENTS

| | | |
|---|---|---|
| 1,128,331 | France | Aug. 20, 1956 |